United States Patent
Park et al.

(10) Patent No.: US 7,679,677 B2
(45) Date of Patent: Mar. 16, 2010

(54) BROADCAST RECEIVING DEVICE FOR DISPLAYING CLOSED CAPTION DATA AND METHOD THEREOF

(75) Inventors: Hye-joung Park, Yongin-si (KR); Eun-kyung Park, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 988 days.

(21) Appl. No.: 11/415,086

(22) Filed: May 2, 2006

(65) Prior Publication Data
US 2007/0019108 A1    Jan. 25, 2007

(30) Foreign Application Priority Data
Jul. 25, 2005   (KR) ...................... 10-2005-0067558

(51) Int. Cl.
*H04N 7/00*  (2006.01)
*H04N 11/00* (2006.01)

(52) U.S. Cl. ..................... 348/468; 348/563

(58) Field of Classification Search ................. 348/468, 348/466, 461, 465, 467, 473–479, 607, 563, 348/564, 569
See application file for complete search history.

(56) References Cited

U.S. PATENT DOCUMENTS 5,506,626 A * 4/1996 Yagi et al. ................... 348/464
6,239,843 B1   5/2001 Gaudreau
7,467,088 B2 * 12/2008 Momosaki et al. .......... 704/270

FOREIGN PATENT DOCUMENTS

| JP | 2004-304531    | 10/2004 |
| KR | 10-1994-0005387 B1 | 6/1994 |
| KR | 10-0194022 B1  | 2/1999 |
| KR | 10-2000-0028165 A | 5/2000 |
| KR | 10-2004-0016481 A | 2/2004 |

* cited by examiner

*Primary Examiner*—M. Lee
(74) *Attorney, Agent, or Firm*—Roylance, Abrams, Berdo and Goodman, LLP

(57) ABSTRACT

A broadcast receiving device and method are provided with a function for displaying closed caption data. The broadcast receiving device according to embodiments of the present invention includes a signal receiving part for receiving a composite video signal, a signal processing part for signal-processing the composite video signal and converting the signal into an output format signal, a noise calculating part for calculating the noise level of the composite video signal, and a caption data detecting part for detecting closed caption data from the composite video signal and if the noise level is less than a threshold level, only then providing the closed caption data to the signal processing part to be inserted in the output format signal. Accordingly, noise degradation of the image quality can be prevented.

9 Claims, 3 Drawing Sheets

BROADCAST RECEIVING DEVICE FOR DISPLAYING CLOSED CAPTION DATA AND METHOD THEREOF

CROSS-REFERENCE TO RELATED APPLICATIONS

This application claims the benefit under 35 U.S.C. §119(a) of Korean Patent Application No. 10-2005-0067558, filed in the Korean Intellectual Property Office on Jul. 25, 2005, the entire disclosure of which is incorporated herein by reference.

BACKGROUND OF THE INVENTION

1. Field of the Invention

The present invention relates to a broadcast receiving device for displaying closed caption data and a method thereof. More particularly, the present invention relates to a broadcast receiving device for determining whether to display closed caption data according to the level of noise included in a composite video signal and a method thereof.

2. Description of the Related Art

Recently, some broadcast receiving devices have included a function for displaying closed caption data which displays caption information on one side of a display screen.

The closed caption data is caption data recorded in an area of a video signal. The function for displaying closed caption data comprises a function for decoding the closed caption data and then displaying the caption data on an area of the display screen. The closed caption data has been developed to help hearing-impaired people, but it is also useful for a variety of other situations such as spelling education for children, English education for foreigners, and for providing exact communication in a noisy environment such as when relaying sports. In the case of the National Television System Committee (NTSC) standards, the closed caption data is overlapped and received in line 21 of the vertical blanking interval (VBI). The closed caption data can be selected to be displayed according to user preference, unlike the open caption data.

FIG. 1 shows an exemplary waveform of a signal loaded in line 21 of the VBI in the NTSC standards. According to FIG. 1, the line 21 includes a color burst signal 10, a sine wave of 7 cycles (ClockRun-IN) 20, and a caption data signal 30. The caption data signal 30 consists of a beginning bit section of 1 bit and a letter display section of 2 bytes, respectively. Each byte of the letter display section includes clean data of 7 bits and a parity of 1 bit.

The broadcast receiving device slices a caption data signal according to a cycle of the sine wave 20. In this case, the broadcast receiving device uses a fixed slicing level. That is, after an input signal is AD(analog to digital)-converted into a digital signal, the digital signal is compared with the slicing level to determine 0 or 1 bit.

However, video tape or television broadcast signals, including for example, terrestrial waves, NTSC signals, CVBS signals, and composite signals are generally analog signals, so noise can be inserted according to the channel condition and tape condition.

FIG. 2 shows an exemplary waveform of line 21 of a signal inserted with noise. As shown in FIG. 2, noise can be inserted in a section of the sine wave 20 and a section of the caption data signal 30. In this case, a value of the digital signal to be compared with the slicing level becomes different such that caption fonts may be garbled.

In addition, as noise is inserted in the section of the sine wave 20 such that a cycle of caption detection becomes difficult, caption information can be shown on a different area of the display screen. Therefore, the overall image quality of broadcasting can become degraded.

Accordingly, a need exists for a system and method for determining whether to display closed caption data according to the level of noise included in a composite video signal.

SUMMARY OF THE INVENTION

An aspect of embodiments of the present invention is to solve at least the above problems and/or disadvantages, and to provide at least the advantages described below. Accordingly, an aspect of embodiments of the present invention is to provide a broadcast receiving device for determining whether to display closed caption data according to the level of noise included in a composite video signal to prevent degradation in the image quality and a method thereof.

In order to achieve the above-described and other aspects of embodiments of the present invention, a broadcast receiving device is provided comprising a signal receiving part for receiving a composite video signal, a signal processing part for signal-processing the composite video signal and converting the signal into an output format signal, a noise calculating part for calculating a noise level of the composite video signal, and a caption data detecting part for detecting closed caption data from the composite video signal, and if the noise level is less than a threshold level, providing the closed caption data to the signal processing part to be inserted in the output format signal.

The caption data detecting part may slice the vertical blanking interval of the composite video signal based on a slicing level and detect the closed caption data.

Further, the signal processing part may comprise a converter for converting the composite video signal into a digital composite video signal, a comb filter for dividing the digital composite video signal into a plurality of color signals, a decoder for decoding the plurality of color signals, respectively, a mixer for mixing and outputting the decoded plurality of color signals, and a format converter for converting the mixed signal into the output format signal, and if the closed caption data is provided from the caption data detecting part, inserting the closed caption data in the output format signal.

In order to achieve the above-described and other aspects of embodiments of the present invention, a broadcast receiving method can be provided and comprises, receiving a composite video signal, signal-processing the composite video signal and converting the composite video signal into an output format signal, detecting closed caption data from the composite video signal, calculating a noise level of the composite video signal, comparing the noise level and a threshold level, and inserting the closed caption data in the output format signal if the noise level is less than the threshold level.

The step of detecting the closed caption data may comprise, confirming a vertical blanking interval of the composite video signal, and detecting the closed caption data by slicing the vertical blanking interval based on a slicing level.

Further, the step of signal-processing the composite video signal and converting the composite video signal into the output format signal may comprise, converting the composite video signal into a digital composite video signal, dividing the digital composite video signal into a plurality of color signals, decoding the plurality of color signals, respectively, mixing the decoded plurality of color signals, and converting a signal format of the mixed signal into a preset output format.

BRIEF DESCRIPTION OF THE DRAWING FIGURES

The above and other aspects and other features of embodiments of the present invention will become more apparent by describing in detail exemplary embodiments thereof with reference to the attached drawing figures, wherein.

Throughout the drawings, like reference numerals will be understood to refer to like parts, components and structures.

DETAILED DESCRIPTION OF THE EXEMPLARY EMBODIMENTS

Figure 1:
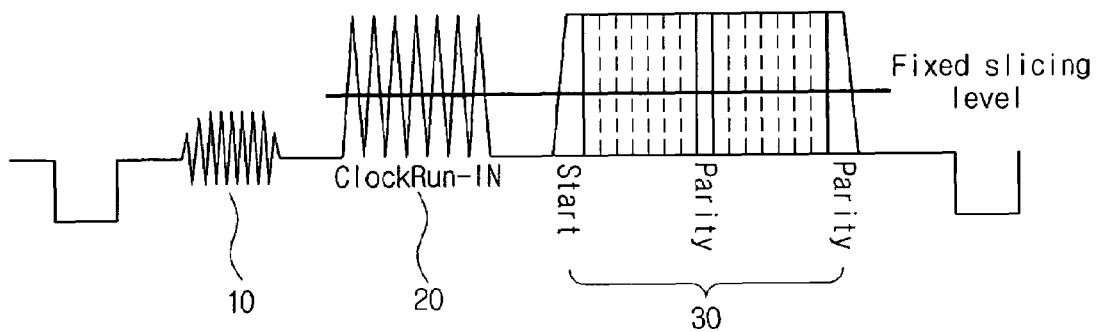
FIG. 1 is a view of an exemplary waveform showing features of a signal of line 21 of the VBI in the NTSC standards.
Figure 2:
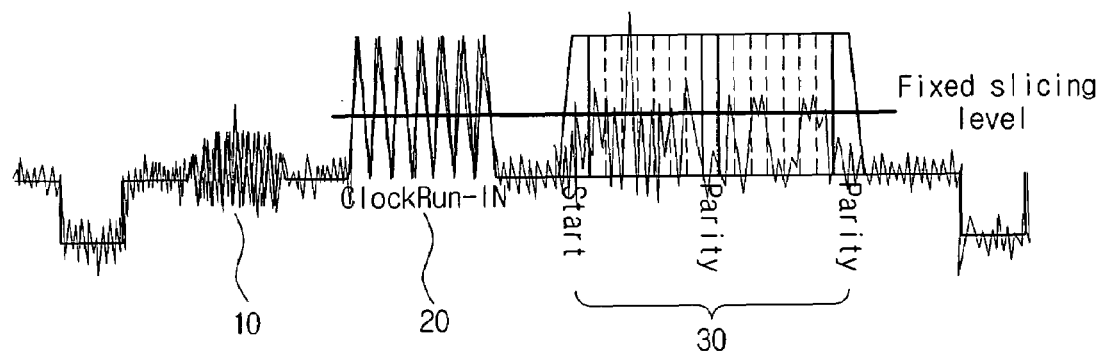
FIG. 2 is a view of an exemplary waveform showing a signal mixed with noise in line 21 of the VBI.

Hereinafter, exemplary embodiments of the present invention will be described in detail with reference to the accompanying drawing figures.

In the following description, same drawing reference numerals are used for the same elements even in different drawings. The matters defined in the description, such as detailed construction and element descriptions, are provided to assist in a comprehensive understanding of the invention. Also, functions or constructions that are well known to those skilled in the art are not described in detail since they would obscure the invention in unnecessary detail.

Figure 3:
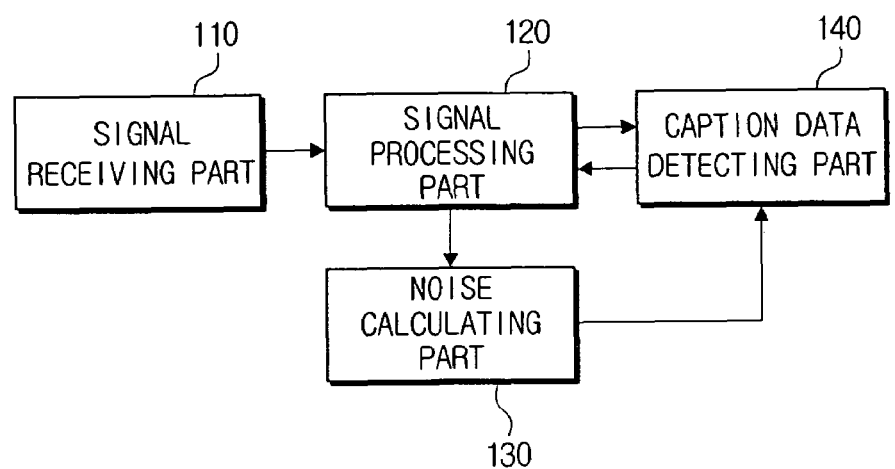
FIG. 3 is a block diagram showing the construction of an exemplary broadcast receiving device according to an embodiment of the present invention.

FIG. 3 is a block diagram showing the construction of an exemplary broadcast receiving device according to an embodiment of the present invention. Referring to FIG. 3, the broadcast receiving device comprises a signal receiving part 110, a signal processing part 120, a noise calculating part 130, and a caption data detecting part 140.

The signal receiving part 110 receives a composite video signal from external sources such as a broadcasting station, a digital video disk (DVD) player, a video cassette recorder (VCR) player, and so forth. The composite video signal is a composite signal of an RGB color signal, a vertical synchronization signal, and a horizontal synchronization signal.

The signal processing part 120 signal-processes the composite video signal to output on a display screen (not shown). The signal processing part 120 performs AD-converting, comb filtering, decoding and mixing.

The noise calculating part 130 calculates a level of noise included in the composite video signal. The noise calculating part 130 can use a conventional noise level detecting method as generally used to detect noise levels, but is not limited thereto. Specifically, the noise calculating part 130 confirms a section of a horizontal line signal using a vertical synchronization signal and a horizontal synchronization signal. Accordingly, after amplifying a horizontal line signal using an amplifier, the absolute value operation in which a (−) signal of the amplified signals is discarded or changed into a (+) signal is performed. Subsequently, the signal passes through a low pass filter and the output value is calculated as a noise level.

Additional details of such a noise level detection system and method are described in Korean Patent Application Nos. 10-1991-0000389 and 10-1996-0013090, the entire disclosures of which are hereby incorporated by reference, and further details are herein omitted for brevity.

The noise calculating part 130 provides the calculated noise level to the caption data detecting part 140.

The caption data detecting part 140 detects closed caption data of the composite video signal. That is, the caption data detecting part 140 confirms the vertical synchronization signal and the horizontal synchronization signal provided from the signal processing part 120 to recognize the VBI. Accordingly, comparing a signal corresponding to a section of the caption data signal 30 of the VBI and a fixed slicing level, the caption data detecting part 140 detects closed caption data.

The caption data detecting part 140 further compares the noise level provided from the noise calculating part 130 and a threshold level. As a result, if the noise level is less than the threshold level, the closed caption data is provided to the signal processing part 120. Accordingly, the signal processing part 120 inserts the closed caption data in the output signal so that video data and the caption information are displayed on the display screen.

However, if the noise level is equal to or greater than the threshold level, the caption data detecting part 140 does not provide the closed caption data to the signal processing part 120. Accordingly, video data without caption information is then displayed on the display screen.

That is, even though the function for displaying closed caption data is activated by the user, if noise included in a composite video signal is large in quantity, the caption information is not displayed. Accordingly, garbled caption information is prevented from covering the image.

The threshold level can be set by a manufacturer of the broadcast receiving device or by the user. Preferably, after a noise level is searched when identifiable caption information is output through a test, the searched noise level can be set as the threshold level. More specifically, the state of caption information on the display screen is checked according to the amount of noise, and the amount of noise at a point right before caption information is recognized as unidentifiable is set as the threshold level.

Figure 4:
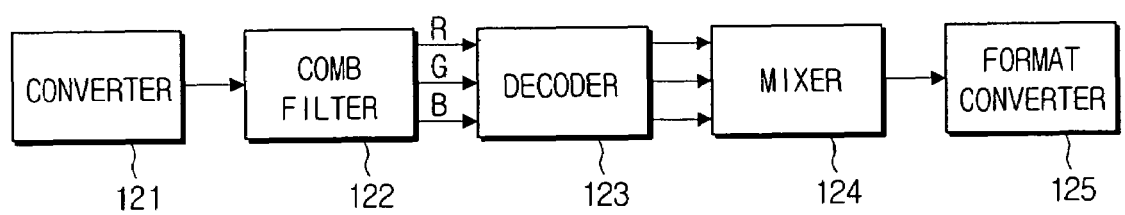
FIG. 4 is a block diagram showing a detailed construction example of the broadcast receiving device of FIG. 3.

FIG. 4 is a block diagram showing a detailed construction example of the signal processing part 120 applied to the display device of FIG. 3. Referring to FIG. 4, the signal processing part 120 comprises a converter 121, a comb filter 122, a decoder 123, a mixer 124 and a format converter 125.

The converter 121 performs analog/digital conversion which converts the composite video signal received through the signal receiving part 110 into the digital composite video signal.

The comb filter 122 divides the digital composite video signal into an RGB color signal, a vertical synchronization signal, and a horizontal synchronization signal. The divided vertical synchronization signal and horizontal synchronization signal are provided to the caption data detecting part 140 so that the caption data detecting part 140 recognizes VBI and detects closed caption data.

The decoder 123 decodes each color signal divided by the comb filter 122.

The decoded signal is provided to the mixer 124. The mixer 124 mixes each of the decoded color signals and transmits the signal to the format converter 125.

The format converter 125 converts a format of the mixed signal into an output format such as the International Telecommunications Union (ITU) format, and generates a signal having an output format. In this case, if closed caption data is provided from the caption data detecting part 140, the format converter 125 inserts the closed caption data in the mixed signal and converts the data into the output format. Accordingly, only closed caption data with a small amount of noise can be displayed on the display screen.

Figure 5:
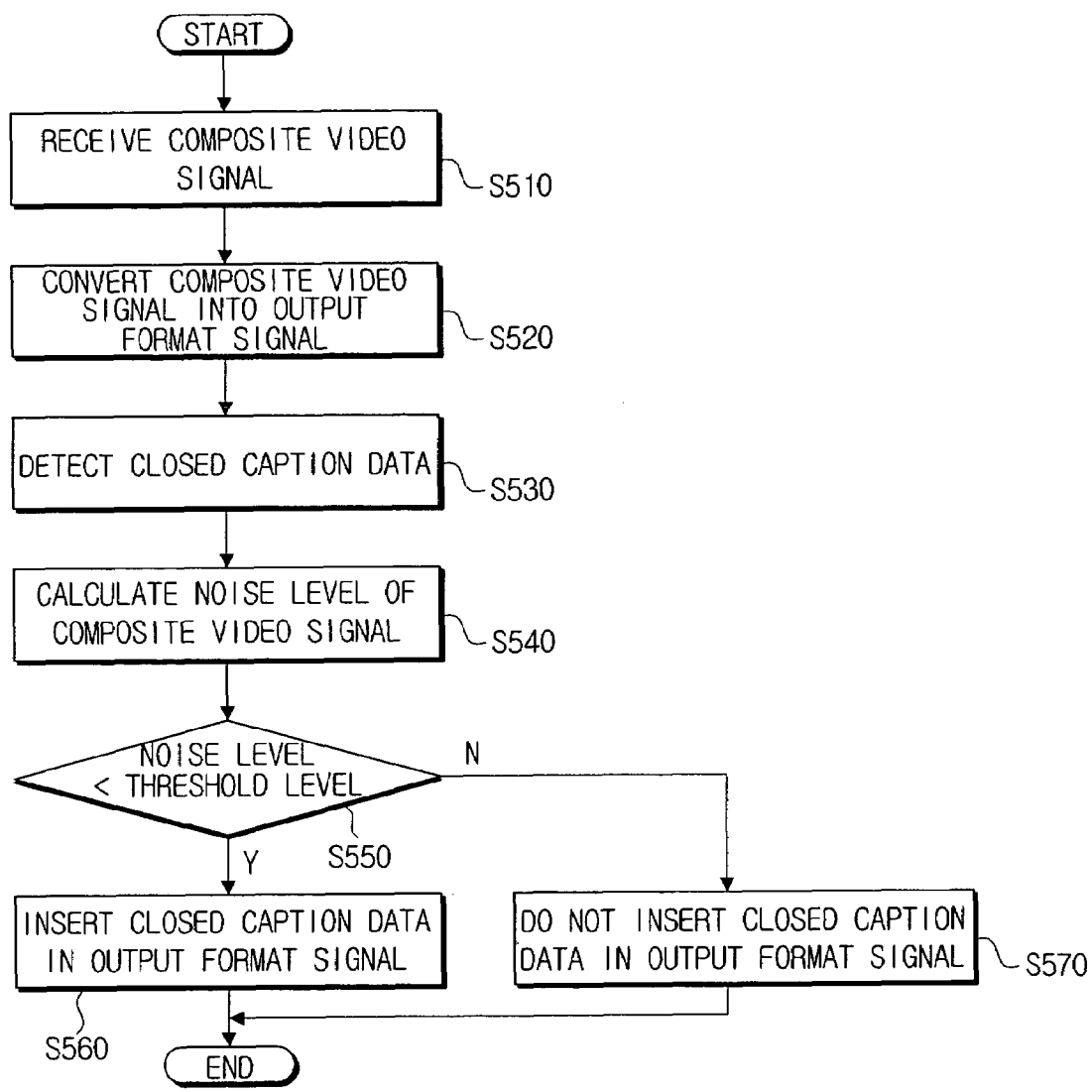
FIG. 5 is a flow chart describing an exemplary broadcast receiving method according to an embodiment of the present invention.

FIG. 5 is a flow chart describing an exemplary broadcast receiving method according to an embodiment of the present invention. Referring to FIG. 5, a composite video signal is received at step (S510), and the signal is signal-processed and converted into a signal of an output format at step (S520).

If the composite video signal includes closed caption data and the function for displaying caption data is set, the closed caption data is detected from the composite video signal at step (S530).

Subsequently, a noise level representing the amount of noise included in the composite video signal is calculated at step (S540).

The exemplary method then compares the calculated noise level and a threshold level at step (S550), and if the noise level is less than the threshold level, the closed caption data is inserted in the output format signal at step (S560).

However, if the noise level is equal to or greater than the threshold level, the closed caption data is not inserted in the output format signal at step (S570). As a result, broadcasting image data without caption information is displayed on the display screen.

As can be appreciated from the above description according to exemplary embodiments of the present invention, if the amount of noise is large, caption information is omitted in spite of the activated function for displaying caption information. Accordingly, garbled caption information is prevented from being displayed on the display screen so that image quality can be improved.

While the present invention has been shown and described with reference to exemplary embodiments thereof, it will be understood by those skilled in the art that various changes in form and detail may be made therein without departing from the spirit and scope of the present invention as defined by the appended claims.

What is claimed is:

1. A broadcast receiving device, comprising:
   a signal receiving part for receiving a composite video signal;
   a signal processing part for signal-processing the composite video signal and converting the signal into an output format signal;
   a noise calculating part for calculating a noise level of the composite video signal; and
   a caption data detecting part for detecting closed caption data from the composite video signal and providing the closed caption data to the signal processing part to be inserted in the output format signal if the noise level is less than a threshold level.

2. The device of claim 1, wherein the caption data detecting part is configured to slice the vertical blanking interval of the composite video signal based on a slicing level and detect the closed caption data.

3. The device of claim 2, wherein the signal processing part comprises:
   a converter for converting the composite video signal into a digital composite video signal;
   a comb filter for dividing the digital composite video signal into a plurality of color signals;
   a decoder for decoding the plurality of color signals, respectively;
   a mixer for mixing and outputting the decoded plurality of color signals; and
   a format converter for converting the mixed signal into the output format signal and inserting the closed caption data in the output format signal if the closed caption data is provided from the caption data detecting part.

4. A broadcast receiving method, comprising:
   receiving a composite video signal;
   signal-processing the composite video signal and converting the composite video signal into an output format signal;
   detecting closed caption data from the composite video signal;
   calculating a noise level of the composite video signal;
   comparing the noise level and a threshold level; and
   inserting the closed caption data in the output format signal if the noise level is less than the threshold level.

5. The method of claim 4, wherein the step of detecting the closed caption data comprises:
   confirming a vertical blanking interval of the composite video signal; and
   detecting the closed caption data by slicing the vertical blanking interval based on a slicing level.

6. The method of claim 5, wherein the step of signal-processing the composite video signal and converting the composite video signal into the output format signal comprises:
   converting the composite video signal into a digital composite video signal;
   dividing the digital composite video signal into a plurality of color signals;
   decoding the plurality of color signals, respectively;
   mixing the decoded plurality of color signals; and
   converting a signal format of the mixed signal into a preset output format.

7. A computer program embodied on a computer-readable medium for outputting broadcast data, comprising:
   a first set of instructions for controlling a signal receiving part for receiving a composite video signal;
   a second set of instructions for controlling a signal processing part for signal-processing the composite video signal and converting the composite video signal into an output format signal;
   a third set of instructions for controlling a caption data detecting part for detecting closed caption data from the composite video signal;
   a fourth set of instructions for controlling a noise calculating part for calculating a noise level of the composite video signal;
   a fifth set of instructions for comparing the noise level and a threshold level; and
   a sixth set of instructions for inserting the closed caption data in the output format signal if the noise level is less than the threshold level.

8. The computer program embodied on a computer-readable medium of claim 7, wherein the detecting the closed caption data comprises:
   a set of instructions for confirming a vertical blanking interval of the composite video signal; and
   a set of instructions for detecting the closed caption data by slicing the vertical blanking interval based on a slicing level.

9. The computer program embodied on a computer-readable medium of claim 8, wherein the signal-processing of the composite video signal and converting the composite video signal into the output format signal comprises:
- a set of instructions for converting the composite video signal into a digital composite video signal;
- a set of instructions for dividing the digital composite video signal into a plurality of color signals;
- a set of instructions for decoding the plurality of color signals, respectively;
- a set of instructions for mixing the decoded plurality of color signals; and
- a set of instructions for converting a signal format of the mixed signal into a preset output format.

* * * * *